(12) United States Patent
Shrivastava (10) Patent No.: US 10,890,964 B2
(45) Date of Patent: Jan. 12, 2021

(54) INTENT BASED INPUTS AND FORCED FEEDBACK SYSTEM FOR A VIRTUAL REALITY SYSTEM

(71) Applicant: Harshit Shrivastava, Madhya Pradesh (IN)

(72) Inventor: Harshit Shrivastava, Madhya Pradesh (IN)

( * ) Notice: Subject to any disclaimer, the term of this patent is extended or adjusted under 35 U.S.C. 154(b) by 0 days.

(21) Appl. No.: 16/068,254

(22) PCT Filed: Jan. 6, 2017

(86) PCT No.: PCT/IB2017/050046
§ 371 (c)(1),
(2) Date: Jul. 5, 2018

(87) PCT Pub. No.: WO2017/118939
PCT Pub. Date: Jul. 13, 2017

(65) Prior Publication Data
US 2019/0025907 A1 Jan. 24, 2019

(30) Foreign Application Priority Data

Jan. 7, 2016 (IN) .............................. 201621000615

(51) Int. Cl.
*G06F 3/01* (2006.01)
*G09B 9/00* (2006.01)
(Continued)

(52) U.S. Cl.
CPC .............. *G06F 3/011* (2013.01); *A63F 13/00* (2013.01); *G06F 3/016* (2013.01); *G06F 3/017* (2013.01); *G06F 3/033* (2013.01); *G06F 3/0487* (2013.01); *G09B 9/00* (2013.01); *G09B 9/003* (2013.01); *G09B 19/00* (2013.01); *A63F 13/218* (2014.09); *A63F 2300/8082* (2013.01)

(58) Field of Classification Search
CPC .......... G06F 3/011; G06F 3/017; G06F 3/016; G06F 3/0487; G06F 3/033; G09B 19/00; G09B 9/003; G09B 9/00; A63F 13/00; A63F 13/218; A63F 2300/8082
See application file for complete search history.

(56) References Cited

U.S. PATENT DOCUMENTS 3,368,222 A * 2/1968 Van Patten ............ B64D 10/00
2/22
5,282,460 A * 2/1994 Boldt ........................ A61F 2/68
601/5

(Continued)

FOREIGN PATENT DOCUMENTS

WO WO2015094588 6/2015

*Primary Examiner* — Amy Onyekaba
(74) *Attorney, Agent, or Firm* — Fish IP Law, LLP (57) ABSTRACT

The present disclosures relate to virtual reality systems that can be used to fully immerse a user in a virtual environment. In particular, it relates to a system that can sense the intent of movement of some or all parts of a user's body by measuring the force and direction of the force applied by that part of the user's body, can provide force feedback to the user and can provide inputs to the VR system that can be used to replicate the intended action of the user in the Virtual Reality environment and provide visual and/or aural feedback to the user; without the user's body parts actually moving.

10 Claims, 9 Drawing Sheets

(51) Int. Cl.
*G09B 19/00* (2006.01)
*G06F 3/0487* (2013.01)
*A63F 13/00* (2014.01)
*G06F 3/033* (2013.01)
*A63F 13/218* (2014.01)

(56) References Cited

U.S. PATENT DOCUMENTS

| | | | | |
|---|---|---|---|---|
| 5,323,174 | A * | 6/1994 | Klapman | G06F 3/0338 345/156 |
| 5,375,908 | A * | 12/1994 | Goor | B60R 21/01 297/216.11 |
| 5,390,952 | A * | 2/1995 | Goor | B60R 21/01 280/730.1 |
| 5,791,351 | A * | 8/1998 | Curchod | A61B 5/1121 600/587 |
| 5,980,256 | A * | 11/1999 | Carmein | A63B 22/02 434/29 |
| 6,052,114 | A * | 4/2000 | Morifuji | G06F 3/011 345/158 |
| 6,088,017 | A * | 7/2000 | Tremblay | G06F 3/011 345/156 |
| 6,259,042 | B1 * | 7/2001 | David | G01G 19/4142 177/136 |
| 6,513,829 | B1 * | 2/2003 | Zumpano | B60N 2/286 280/730.1 |
| 6,916,273 | B2 * | 7/2005 | Couvillion, Jr. | A63B 22/025 482/8 |
| 7,117,136 | B1 * | 10/2006 | Rosedale | G06F 3/016 703/7 |
| 7,520,836 | B2 * | 4/2009 | Couvillion, Jr. | G09B 19/00 482/8 |
| 8,251,397 | B2 * | 8/2012 | Tabe | B60R 21/0134 280/735 |
| 9,067,097 | B2 * | 6/2015 | Lane | G06F 3/011 |
| 2003/0018449 | A1 * | 1/2003 | Couvillion, Jr. | A63B 22/025 702/150 |
| 2003/0120183 | A1 * | 6/2003 | Simmons | G06F 3/011 600/595 |
| 2005/0083207 | A1 * | 4/2005 | Smith | A61F 5/3776 340/668 |
| 2009/0256800 | A1 * | 10/2009 | Kaufman | G06F 3/011 345/156 |
| 2011/0230314 | A1 * | 9/2011 | Hoffman | A63B 24/0062 482/51 |
| 2015/0169120 | A1 * | 6/2015 | Sanchez | G06F 3/011 345/173 |
| 2015/0227210 | A1 * | 8/2015 | Chen | G06K 9/00355 345/156 |
| 2016/0008206 | A1 * | 1/2016 | Devanaboyina | A61H 1/001 601/136 |
| 2016/0343216 | A1 * | 11/2016 | Provancher | G05G 5/03 |
| 2017/0003738 | A1 * | 1/2017 | Silkin | G06F 3/017 |
| 2017/0025026 | A1 * | 1/2017 | Ortiz Catalan | A61B 5/0488 |

* cited by examiner

INTENT BASED INPUTS AND FORCED FEEDBACK SYSTEM FOR A VIRTUAL REALITY SYSTEM

TECHNICAL FIELD

The present disclosure relates generally to virtual reality systems that can be used to fully immerse a user in a virtual environment. In particular, the present disclosure provides a system and method for providing an intent based input to a virtual reality system to replicate the intended action of the user in the Virtual Reality environment and to provide visual and/or aural feedback to the user.

BACKGROUND

Background description includes information that may be useful in understanding the present invention. It is not an admission that any of the information provided herein is prior art or relevant to the presently claimed invention, or that any publication specifically or implicitly referenced is prior art.

Virtual reality is a technology for displaying a virtual environment to a user with the virtual environment appearing to the user to be a visually "real environment." The virtual image or image signal is generated by a computer that allows a user to dissociate him from a physical environment and act as if in the virtual reality environment. Applications for virtual reality include video gaming, entertainment, military training simulations, law enforcement training simulations, fire fighter training simulations, NASA space simulations, flight simulations, science education simulations, and various medical, architectural and design applications. Recently, virtual reality systems have included 3-dimensional graphic images thereby making the virtual world appear more realistic and immersive. As computers and computer graphics advance, increased detailed computer graphics utilizing millions of polygons are used for virtual image construction. Virtual human images are now possible using laser scanning technologies to scan the body of a physical individual.

To create a virtual world with virtual images, images and textures are traditionally programmed into graphics engines. Additionally, images may be created from digitized photos or video or from scanned images. These virtual images and their three dimensional characterizations are stored in computer memory. These stored images are manipulated to produce a virtual reality image signal that is presented for displaying to the user often as a result of a user input or under computer programmed control.

Current methods of interacting with virtual content in a virtual reality environment are based on digital inputs (generally provided by buttons) or analog inputs (a joystick, for example. Some systems also use motion control wherein the movement of a wearable device or the entire body is tracked using optical tracking devices. Buttons and joysticks restrict the possible inputs of the users to a very narrow range of possibilities. Given the human physiology, only a few body parts can be used for operating these and the full range of body movement cannot be easily duplicated.

Motion control devices, on the other hand, can track only a limited part of body if wearable devices are being used, or require complicated 3D imaging setups. Image based body tracking technology is neither accurate nor very responsive. Besides, it is restrictive and requires the user to remain within the line of sight of the cameras.

All these systems require some explicit movement to generate a response in the Virtual Environment. Besides, none of these systems provide for a system wherein the force required from the user reflects that needed for the task. For example, in such systems the user won't feel any difference if he is lifting a 2 kg log or a 5 kg log, or if he is pushing an open door or a heavy table whereas to simulate the object and the environment closely, the system should require the user to apply a force of more than twice the magnitude to move a 5 kg object than in a 2 kg object to see a response in the virtual world. Likewise, the system should require the user to use less force when he is pushing an open door than when he is pushing a heavy table. In other words, the system should provide for a force feedback to the user over and above the visual and/or aural one usually provided.

Hence, there is a need in the art for a system that is not restrictive, can get inputs from all parts of the body, can be highly precise and accurate if so required by the application, takes into account the amount of force applied by a body part and provides force feedback accordingly to that body part while providing for a visual representation in the Virtual Reality environment as well as visual and/or aural feedback to the user, and does not depend only on explicit movements for its operation but can consider the intent of the user.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

An object of the present disclosure is to provide a system for providing intent based input to a virtual reality system.

Another object of the present disclosure is to provide a method for providing intent based input to a virtual reality system.

Still object of the present disclosure is to provide a system for providing intent based input to a virtual reality system that can enable a user to fully immerse in the virtual environment.

Another object of the present disclosure is to provide a system does not depend only on explicit movements for its operation.

Another object of the present disclosure is to provide system that enable user to provide input(s) without actually moving and hence no work being done, only force being applied.

Another object of the present disclosure is to provide a system that allows rescaling in the avatar to allow users do things that are not physically easy to do or those that are entirely impossible to do such as back flips, very high jumps in a game, change body direction mid air and the likes.

Various objects, features, aspects and advantages of the present invention will become more apparent from the detailed description of the invention herein below along with the accompanying drawings/figures in which like numerals represent like components.

SUMMARY

The present disclosure relates generally to virtual reality systems that can be used to fully immerse a user in virtual environment. In particular, the present disclosure provides a system and method for providing an intent based input to a virtual reality system to replicate the intended action of the user in the Virtual Reality environment and to provide visual and/or aural feedback to the user.

An aspect of the present disclosure provides a system for providing an intent based input to a virtual reality system, the system comprising: at least one pressure and direction sensitive restraint, wherein said at least one pressure and direction sensitive restraint is configured to sense any or a combination of magnitude of pressure and direction of force exerted thereon when fastened to a user; and a pressure and direction information receiving module, wherein said pressure and direction information receiving module is configured to receive any or a combination of the magnitude of pressure and the direction of force from said at least one pressure and direction sensitive restraint and wherein said pressure and direction information receiving module is further configured to interpret the magnitude of pressure and the direction of force to determine an intent of the user to be inputted to the virtual reality system.

In an embodiment, the at least one pressure and direction sensitive restraint is fastened to any or a combination of hand, leg, shoulder, ankle, head and torso of the user to restrain movement thereof. In an embodiment, the at least one pressure and direction sensitive restraint comprises at least one anchor and at least one substantially rigid body connected thereto via a holder. In an embodiment, the at least one anchor is fastened to a fixed joint and wherein said at least one substantially rigid body is fastened to a moveable joint of the user. In an embodiment, the pressure and direction information receiving module is coupled to said at least one pressure and direction sensitive restraint via any or a combination of a wired means and a wireless means. In an embodiment, the intent of the user is inputted to the virtual reality system via any or a combination of a wired means and a wireless means.

Another aspect of the present disclosure relates to a method to provide an intent based input to a virtual reality system, the method comprising the steps of: receiving an applied pressure and a direction of force causing the applied pressure sensed by a pressure and direction sensitive restraint fastened to a user; interpreting the applied pressure and the direction of force causing the applied pressure to determine an intent based input; and forwarding the intent based input to the virtual reality system to replicate user's intended actions in said virtual reality system. In an embodiment, the pressure and direction sensitive restraint is fastened to any or a combination of hand, leg, shoulder, ankle, head and torso of the user to restrain movement thereof. In an embodiment, the pressure and direction sensitive restraint comprises at least one anchor and at least one substantially rigid body connected thereto via a holder. In an embodiment, the at least one anchor is fastened to a fixed joint and wherein said at least one substantially rigid body is fastened to a moveable joint of the user.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIGS. 3A and 3B illustrate top and lateral view of a user's hand fastened with pressure and direction sensitive restraint to provide intent based inputs from palm and wrist joint(s)

to a virtual reality system, in accordance with an embodiment of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

The term 'Virtual Reality' or 'VR' as used herein stands for an immersive multimedia or computer-simulated life, that replicates an environment that simulates physical presence in places in the real world or imagined worlds and lets the user interact in that world. Virtual reality artificially creates sensory experiences that can include sight, hearing, touch, and smell. Most up to date virtual reality environments are displayed either on a computer screen or with special stereoscopic displays/head mounted displays, and some simulations include additional sensory information and focus on real sound through speakers or headphones targeted towards VR users. Some advanced haptic systems now include tactile information as well.

The term 'avatar' as used herein stands for the graphical representation of the user or the user's alter-ego or character in a Virtual Reality environment. It may take either a three-dimensional form, as in games or virtual worlds, or a two-dimensional form as an icon in Internet forums and other online communities.

The term 'unnatural' as used herein stands for a force feedback and tension that can be different from force feedback and tension that are created when a movement actually happens.

The term 'ground' as used herein stands for a fixed object. Fixed object can be a chair on which a user can sit or can be any other fixed object that can be used by a user. A pressure and direction sensitive restraint (PDSR) with ground restraint can be a PDSR which is rigidly/semi flexibly fixed to the ground.

The present disclosure relates generally to virtual reality systems that can be used to fully immerse a user in virtual environment. In particular, the present disclosure provides a system and method for providing an intent based input to a virtual reality system to replicate the intended action of the user in the Virtual Reality environment and to provide visual and/or aural feedback to the user.

An aspect of the present disclosure provides a system for providing an intent based input to a virtual reality system, the system comprising: at least one pressure and direction sensitive restraint, wherein said at least one pressure and direction sensitive restraint is configured to sense any or a combination of magnitude of pressure and direction of force exerted thereon when fastened to a user; and a pressure and direction information receiving module, wherein said pressure and direction information receiving module is configured to receive any or a combination of the magnitude of pressure and the direction of force from said at least one pressure and direction sensitive restraint and wherein said pressure and direction information receiving module is further configured to interpret the magnitude of pressure and the direction of force to determine an intent of the user to be inputted to the virtual reality system. In an embodiment, the at least one pressure and direction sensitive restraint is fastened to any or a combination of hand, leg, shoulder, ankle, head and torso of the user to restrain movement thereof. In an embodiment, the at least one pressure and direction sensitive restraint comprises at least one anchor and at least one substantially rigid body connected thereto via a holder. In an embodiment, the at least one anchor is fastened to a fixed joint and wherein said at least one substantially rigid body is fastened to a moveable joint of the user. In an embodiment, the pressure and direction information receiving module is coupled to said at least one pressure and direction sensitive restraint via any or a combination of a wired means and a wireless means. In an embodiment, the intent of the user is inputted to the virtual reality system via any or a combination of a wired means and a wireless means.

Another aspect of the present disclosure relates to a method to provide an intent based input to a virtual reality system, the method comprising the steps of: receiving an applied pressure and a direction of force causing the applied pressure sensed by a pressure sensitive restraint fastened to a user; interpreting the applied pressure and the direction of force causing the applied pressure to determine an intent based input; and forwarding the intent based input to the virtual reality system to replicate user's intended actions in said virtual reality system. In an embodiment, the pressure and direction sensitive restraint is fastened to any or a combination of hand, leg, shoulder, ankle, head and torso of the user to restrain movement thereof. In an embodiment, the pressure and direction sensitive restraint comprises at least one anchor and at least one substantially rigid body connected thereto via a holder. In an embodiment, the at least one anchor is fastened to a fixed joint and wherein said at least one substantially rigid body is fastened to a moveable joint of the user.

Figure 1:
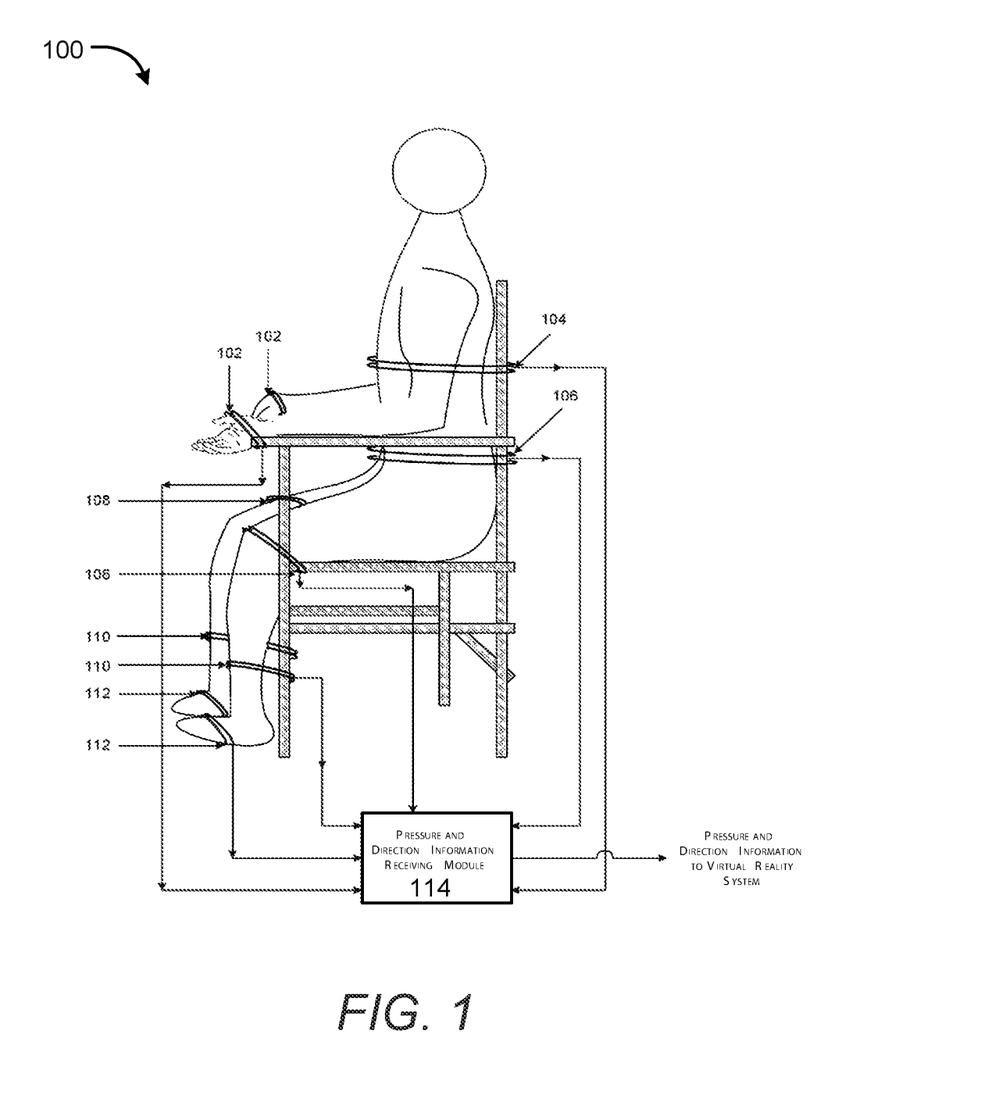
FIG. 1 illustrates an exemplary representation of the proposed system to provide intent based inputs and force feedback for a virtual reality system, in accordance with an embodiment of the present disclosure.

As illustrated in FIG. 1, in accordance with an exemplary embodiment of the present disclosure, the system for providing an intent based input to a virtual reality system (hereinafter also referred to as VR system) can include at least one pressure and direction sensitive restraint (PDSR) that can keep part(s) of user's body immoveable as shown as hand restraints 102, torso restraints 104, stomach restraints 106, legs restraints 108, ankles restraints 110 and feet restraints 112 and the likes, and a pressure and direction receiving module 114 that can be operatively coupled to a VR system. The exemplary embodiment shows limited number of restraints for simplicity of explanation, however in different implementations, head restraint, backbone restraint, waist restraints, and the like can also be used to detect and measure pressure at different points. As one may appreciate, there can be two hand restraints 102, one for each hand, similarly there can be two legs restraints 108, one for each leg, two shoulder restraints, one for each shoulder, two ankle restraints 110, one of each ankle to measure pressure of different hands, legs, shoulders, ankles and the likes.

In an embodiment, PDSRs can be configured to sense (detect and/or measure) the magnitude of pressure being exerted on them and direction of the force causing that pressure. In another embodiment, PDSRs can be configured to detect and measure the magnitude of pressure being exerted on them and direction of the force causing that pressure when the force is applied in opposite direction as well. The PDSRs can be configured to detect and measure the pressure applied in either directions, like pressure applied while pushing an object or pressure applied while pulling an object. The PDSRs can be configured to accommodate multiple pressure sensing modules in a single restraint sufficient to calculate the magnitude and direction of net force and/or torque applied on that restraint. Pressure being exerted on PDSR can refer to either one value of pressure or multiple values of pressure measured by different sensing modules placed in various positions in the PDSR.

In an embodiment, the system can include a pressure and direction receiving module 114 that can receive information from any one, some or a plurality of PDSRs regarding the identity, direction of force causing pressure and pressure being exerted on each of the said one, some or all of the PDSRs. In an embodiment, the pressure and direction information receiving module can be further configured to interpret the magnitude of pressure and the direction of force to determine intent of the user to be inputted to the virtual reality system. Alternatively, the pressure and direction information receiving module can pass the information as received from the plurality of PDSRs to a Virtual Reality (VR) system that can use such information to replicate the user's intended actions in the virtual world and also provide visual and/or aural feedback to the user. In an embodiment, the restraining modules can allow a small amount of movement to make the virtual experience more immersive by incorporating scaled down physical movements of user.

In another embodiment, as the user puts pressure on any PDSR, identity, direction of force causing pressure and magnitude of same can be passed on to pressure and direction receiving module 114 that can pass it to the VR system. The VR system can then replicate the user's intended actions by moving, on the screen or in the VR headset, the representation of that body part of the user's avatar in a fashion mirroring the direction and magnitude of force user is applying on that body part in the real environment thereby providing the user with visual and/or aural feedback.

In another embodiment, the VR system can display the movements and reactions in the virtual world depending on the amount of force applied by the user and depending on the resistive force applied on that body by its virtual surroundings. A larger amount of force will be required to move a heavier object and the user will feel an equal and opposite force of that larger magnitude while moving it. Hence, the system can take into account the force applied by user and can also provide user with a force feedback.

In this fashion, the system 100 can provide the user with both visual and/or aural and force feedback. So the user's mind will not be able to differentiate whether he is actually moving his body part or whether he is actually bound. Hence, the system can trick users mind as if he is actually moving his body parts (or entire body, depending upon the system configuration) without actually moving any part of user's body. In an exemplary embodiment, the system 100 can trick the user's mind to an extent that the user will feel an outer body experience as if he is physically his avatar moving freely in the virtual world, doing tasks which are physically impossible otherwise. In such a way the system 100 of the present disclosure can sense the intent of movement of some or all parts of a user's body by measuring the force applied by that part of the user's body and replicate that intended action in the Virtual Reality environment, while providing visual and/or aural and force feedback to the user.

Figure 2:
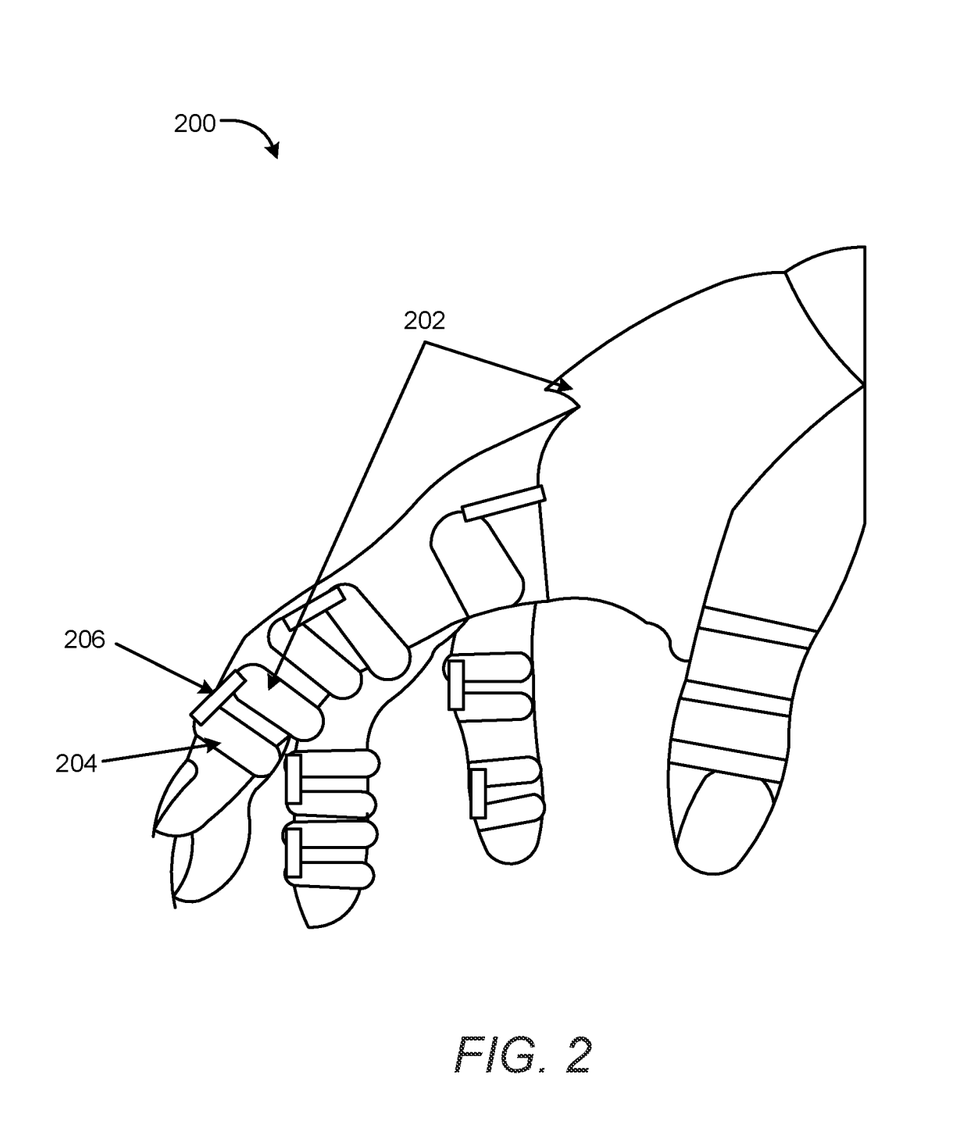
FIG. 2 illustrates a lateral view of a user's hand fastened with pressure and direction sensitive restraint (hereinafter referred to as PDSR) to provide intent based inputs from fingers/thumb and finger joint(s) to a virtual reality system, in accordance with an embodiment of the present disclosure.

FIG. 2 illustrates a lateral view of a user's hand fastened with pressure and direction sensitive restraint (hereinafter referred to as PDSR) to provide intent based inputs from fingers/thumb and finger joint(s) to a virtual reality system, in accordance with an embodiment of the present disclosure. In an embodiment, restriction of most movements can be afforded by stopping relative movements of two sides of a joint. This can be achieved by connecting the two sides of a joint with substantial rigidity. In an exemplary embodiment, connecting the two sides of a joint with substantial rigidity can be done by wrapping two ends of the joint with two rigid or substantially rigid bodies (shown as 202 and 204) connected by a holder (shown as 206). In an implementation, one of the rigid or substantially rigid bodies can act as an anchor (202) that can be connected to the other rigid or substantially rigid body (204) via a holder (206). In another embodiment, the holder can be rigid or semi-rigid or flexible. As illustrated in FIG. 2, moving end of a finger joint (alternatively or generally also referred to as moveable joint) can be fastened to a rigid or substantially rigid body (204), while the other end of the finger joint (alternatively or generally also referred to as fixed joint) can be fastened to another rigid or substantially rigid body (202), which can act as an anchor for restraining movement thereof. The two rigid bodies (shown as 202 and 204) can be rigidly or semi-rigidly joined by another connecting body such as a holder (206). In an embodiment, the holder can be flexible enough to allow small movements of the user in order to make the experience more realistic for the user.

In an embodiment, PDSRs can be of different forms and arrangements, such as sensors, and other PDSRs as known to a person skilled in the art. In an embodiment, PDSRs can be placed in different ways, as known to a person skilled in the art. In an embodiment, factors that can be used by the system to judge body's position can include proprioceptors, skin touch area, temperature, pain, and other related bodily factors, as known to a person skilled in the art. In an exemplary embodiment, body parts can be kept and locked in a relaxed state, where any or a combination of skin contact, muscle strain, skin or bone strain can be minimal. In a preferred embodiment, the chosen relaxed state of body parts can be the average state of different types of frequent movements done by the joint, to deliver a convincing experience to a user while the user tries to move.

Figure 3A:
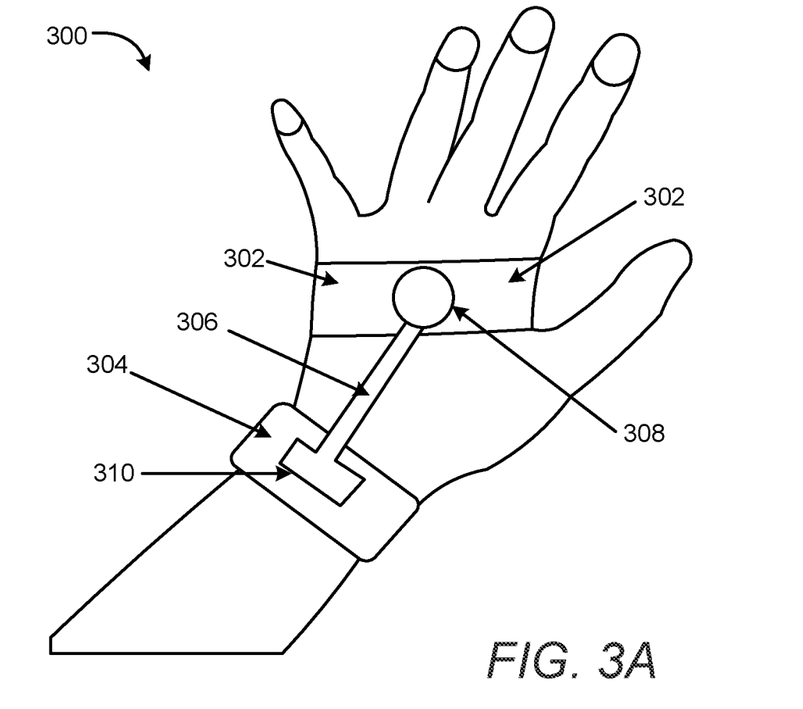
Figure 3B:
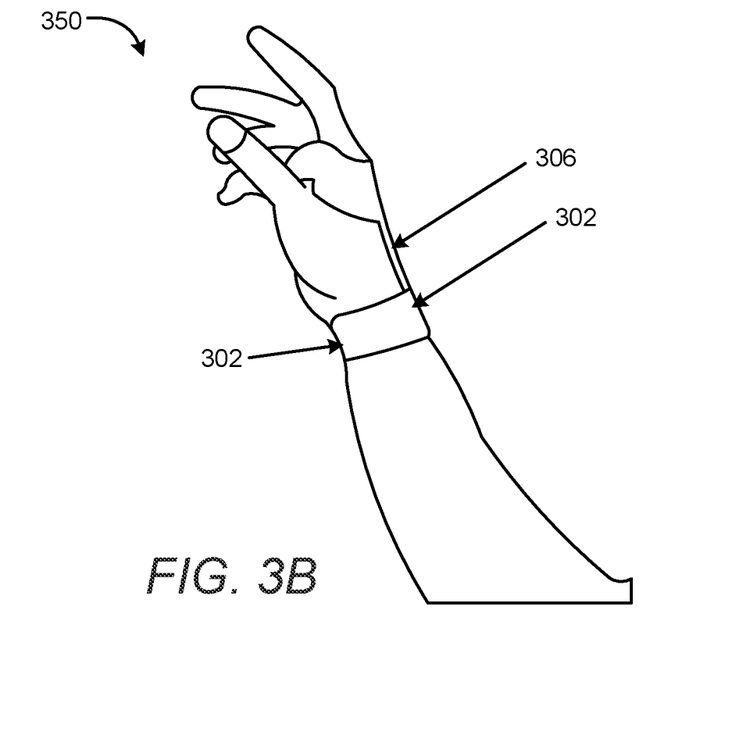

FIGS. 3A and 3B illustrate top and lateral view of a user's hand fastened with pressure and direction sensitive restraint to provide intent based inputs from palm and wrist joint(s) to a virtual reality system, in accordance with an embodiment of the present disclosure. As illustrated, moving end of a wrist joint (alternatively or generally also referred to as moveable joint) can be fastened to a rigid or substantially rigid body (302), while the other end of wrist joint (alternatively or generally also referred to as fixed joint) can be fastened to an anchor (304) for restraining movement thereof. The two bodies can be rigidly or semi-rigidly joined by another connecting body such as a holder (306). In an embodiment, the holder can be flexible enough to allow small movements of the user in order to make the experience more realistic for the user. Non-flexible or rigid points (part of the holder) in palm and wrist area are represented by (308) and (310), respectively.

In an embodiment, the system of the present disclosure can be configured to estimate hand's rotational status/angle at any instant. The angle of hand rotation can be determined using devices that include, but not limited to, accelerometer, gyroscope, magnetometer, or by using other direct physical methods of measurements, as known to or appreciated by a person skilled in the art.

Figure 4:
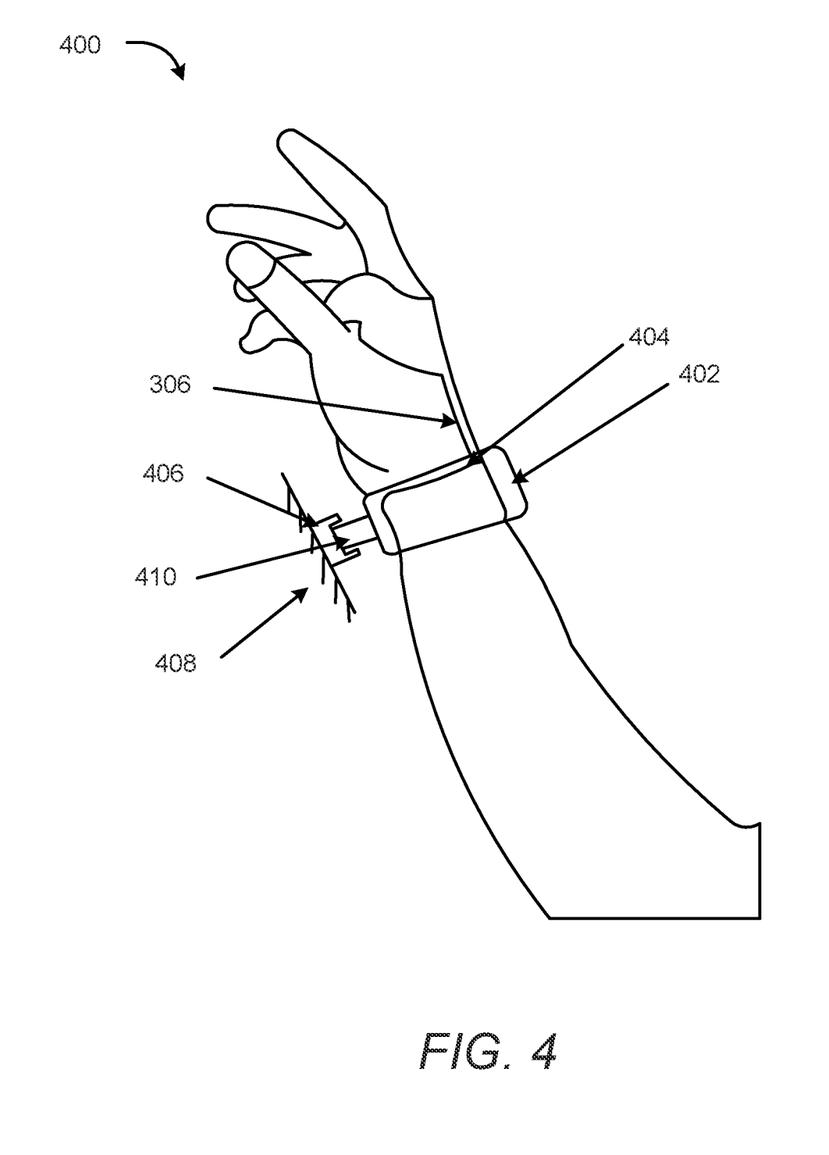
FIG. 4 illustrates a side view of a user's hand fastened with pressure and direction sensitive restraint (PDSR) including a ground restraint to provide intent based inputs from hand(s) rotation to a virtual reality system, in accordance with an embodiment of the present disclosure.

FIG. 4 illustrates a side view of a user's hand fastened with pressure and direction sensitive restraint (PDSR) including a ground restraint to provide intent based inputs from hand(s) rotation to a virtual reality system, in accordance with an embodiment of the present disclosure. As illustrated, moving end of a wrist joint (alternatively or generally also referred to as moveable joint) can be fastened to a rigid or substantially rigid body (402), which can slide on another rigid or substantially rigid body (404), wrapped around the wrist, to enable the rotational movement of hand/wrist. In an exemplary embodiment, another rigid or substantially rigid body (406) can be attached to the rigid or substantially rigid body 404 for detection of front and/or back movement, with ground restraint. In an embodiment, an external anchoring means 408 can be mechanically coupled to the rigid or substantially rigid body 402 via a connecting means 410. The external anchoring means 408 can be semi-flexible to allow hand movement. In an embodiment, rigid or substantially rigid body (406) and external anchoring means 408 can be a part of a combined arrangement. In an embodiment, the system of the present disclosure can be configured to estimate hand's rotational status/angle at any instant. The angle of hand rotation can be determined using devices that include, but not limited to, accelerometer, gyroscope, magnetometer, or by using other direct physical methods of measurements, as known to or appreciated by a person skilled in the art.

Figure 5:
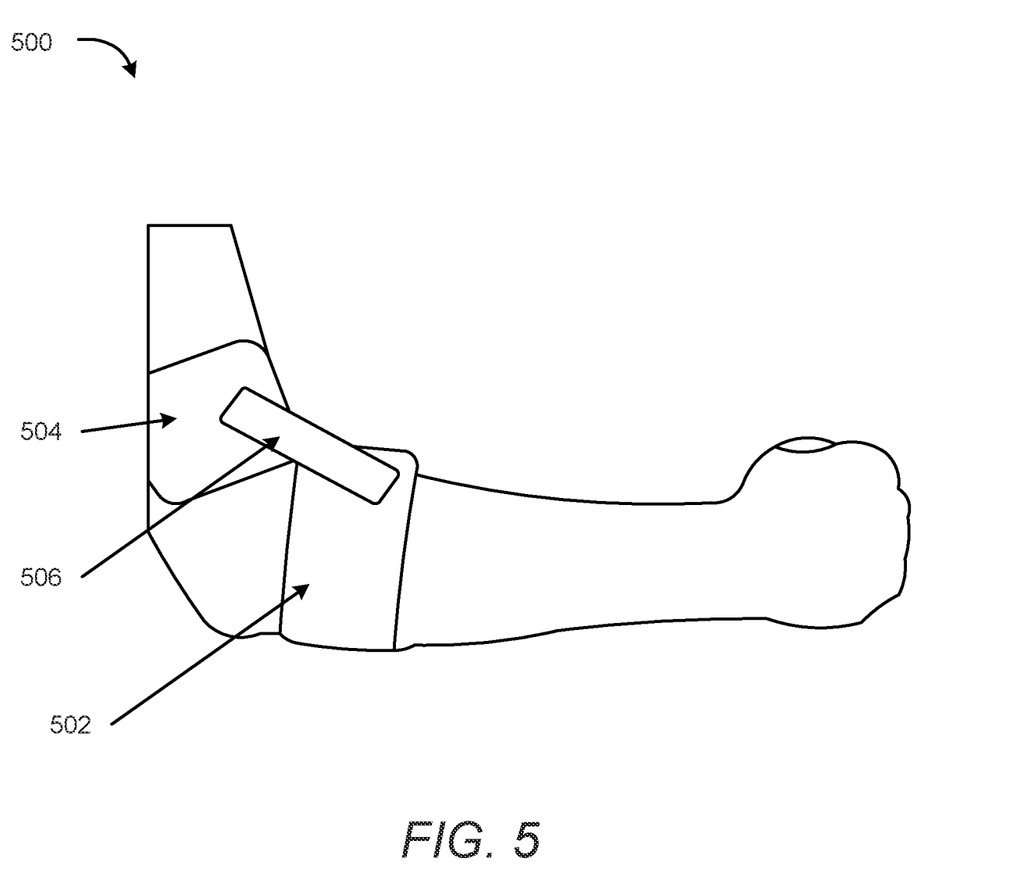
FIG. 5 illustrates a side view of a user's hand fastened with pressure and direction sensitive restraint (PDSR) to provide intent based inputs from elbow joint(s) to a virtual reality system, in accordance with an embodiment of the present disclosure.

FIG. 5 illustrates a side view of a user's hand fastened with pressure and direction sensitive restraint (PDSR) to provide intent based inputs from elbow joint(s) to a virtual reality system, in accordance with an embodiment of the present disclosure. As illustrated, moving end of an elbow joint (alternatively or generally also referred to as moveable joint) can be fastened to a rigid or substantially rigid body (502), while the other end of the elbow joint (alternatively or generally also referred to as fixed joint) fastened to another rigid or substantially rigid body (504), which can act as an anchor for restraining movement thereof. The two rigid bodies (502 and 504) can be rigidly or semi-rigidly joined by another connecting body such as a holder (506). In an embodiment, the holder can be flexible enough to allow small movements of the user in order to make the experience more realistic for the user.

Figure 6:
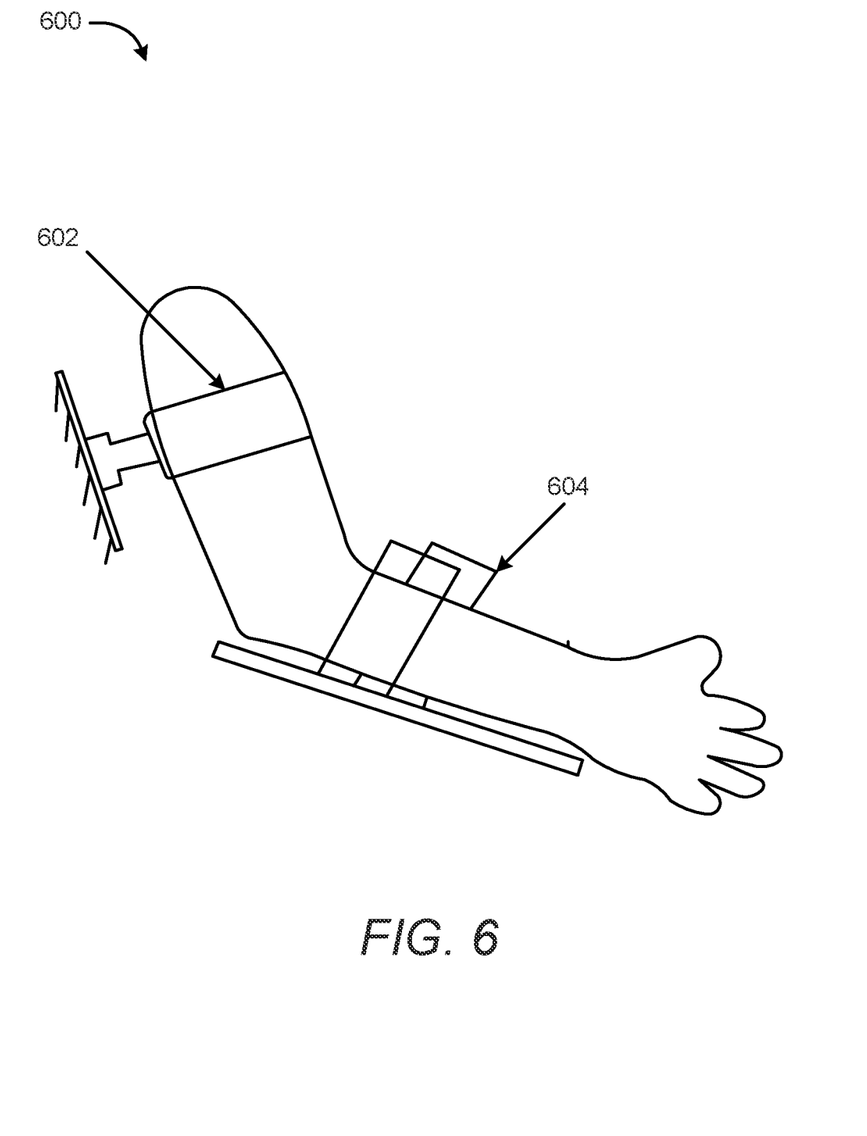
FIG. 6 illustrates a side view of a user's hand fastened with pressure and direction sensitive restraint (PDSR) including a ground restraint, in accordance with an embodiment of the present disclosure.

FIG. 6 illustrates a side view of a user's hand fastened with pressure and direction sensitive restraint (PDSR) including a ground restraint, in accordance with an embodiment of the present disclosure. In an embodiment, PDSRs can be deployed closest to body joints to make force feedback most realistic and to obtain better resolution of which force arises from which joint. In an exemplary embodiment, shoulder joint rigid or substantially rigid body 602 can restrain only shoulder movement and movement arising due to muscles acting on shoulder joint while elbow joint rigid or substantially rigid body 604 can restrain only elbow movement and movement arising due to muscles acting on elbow joint. In this manner, elbow joint rigid or substantially rigid body 604 cannot restrain the movement arising due to muscles acting on shoulder joint, and hence magnitude and direction of forces at each joint can be distinctly identified or measured. In an embodiment, an unnatural force feedback can be given if a restraint is put at a point other than the joint from where the force originated and an unnatural tension can be created in bone and skin.

Figure 7:
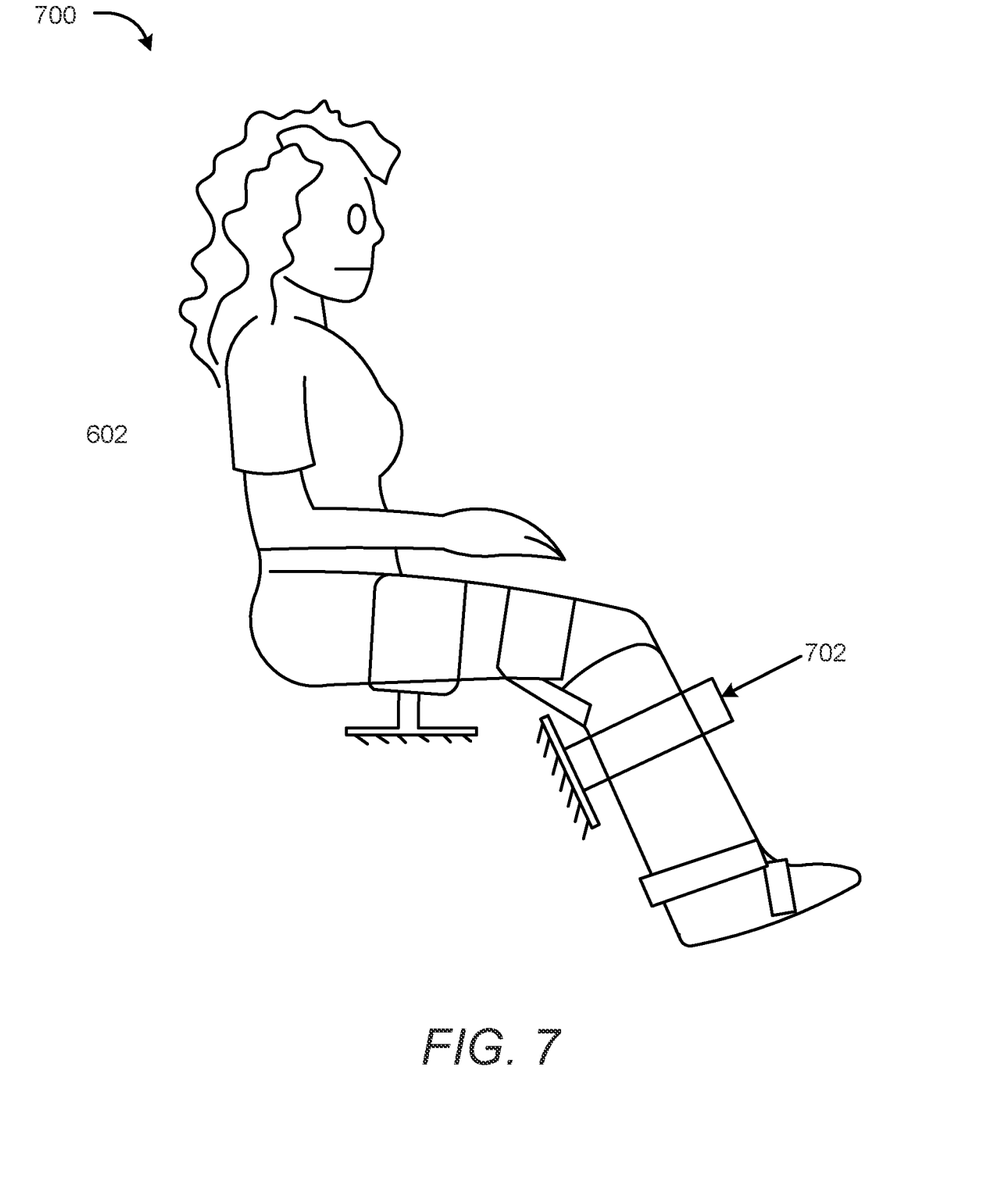
FIG. 7 illustrates a side view of a user's leg fastened with pressure and direction sensitive restraint (PDSR) including a plurality of ground restraints, in accordance with an embodiment of the present disclosure.

FIG. 7 illustrates a side view of a user's leg fastened with pressure and direction sensitive restraint (PDSR) including a plurality of ground restraints, in accordance with an embodiment of the present disclosure. In an exemplary embodiment, knee joint rigid or substantially rigid body 702 can restrain only movement arising due to rotation at the ball and socket joint of leg.

Figure 8:
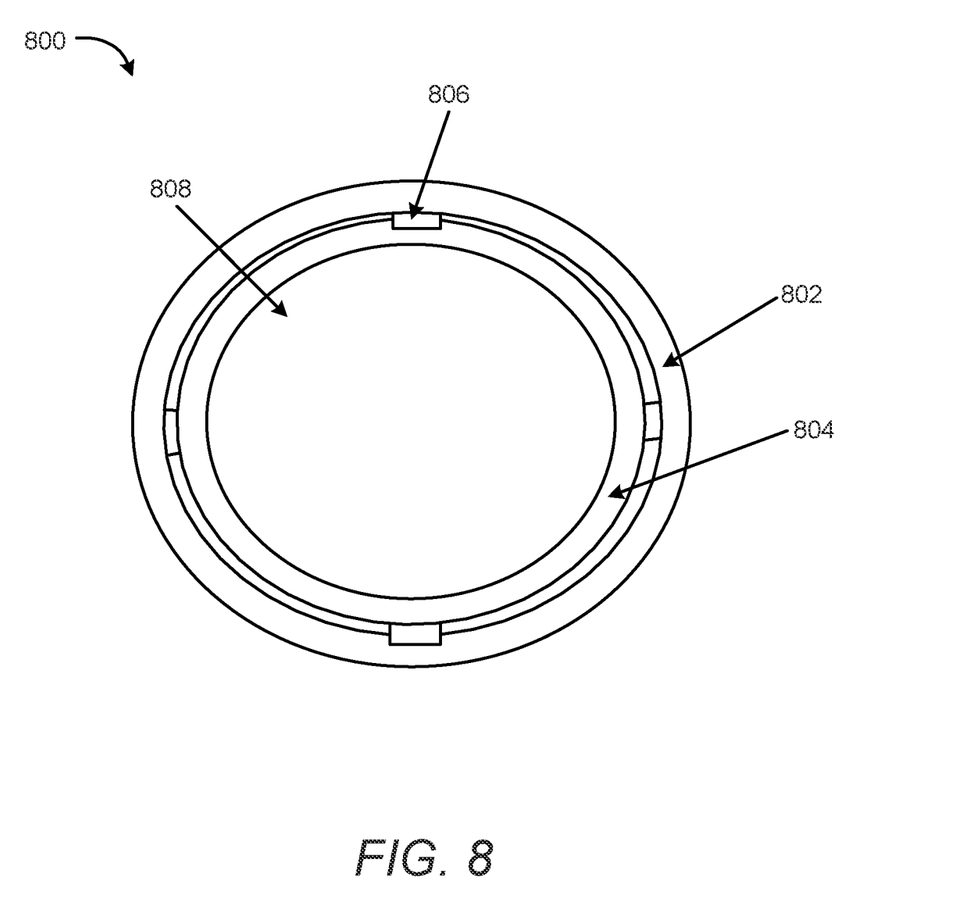
FIG. 8 illustrates anatomy of a PDSR in accordance with an embodiment of the present disclosure.

FIG. 8 illustrates anatomy of a rigid or substantially rigid body in accordance with an embodiment of the present disclosure. A rigid or substantially rigid body of the present disclosure can include (i) an outer layer 802 (ii) an inner layer 804, and (iii) any number of sensors 806. In an implementation, any one, some or plurality of sensors can include pressure sensor. Additionally or alternatively, sensors can include any other types of sensors, as known to or appreciated by a person skilled in the art, to serve its intended purpose as laid down in the present disclosure. The rigid or substantially rigid body of the present disclosure can be wrapped around any body part 808. The rigid or substantially rigid body of the present disclosure can deploy any number of pressure sensors to increase the resolution of data. In an exemplary embodiment, the rigid or substantially rigid body can have 4 pressure sensors. In an embodiment, two pressure sensors can be used if the joint movement happens in only one axis. In an embodiment, three pressure sensors can be used if the joint movement happens in two axes. In an embodiment, one pressure sensor can be used if the joint movement happens in only one direction. In an embodiment, an arm can freely rotate in two axes or along its own axes. The two axis movement of arm can be restrained by restraining the movement arising due to this rotation in some other part of body. Similar PDSR arrangements can be used for legs and other parts of body. In an embodiment, majority of movements can take place around bone joints. Different PDSR types and formations can be used to neutralize movement occurring at different joints while at the same time capturing intent of movement with sufficient details.

Figure 9:
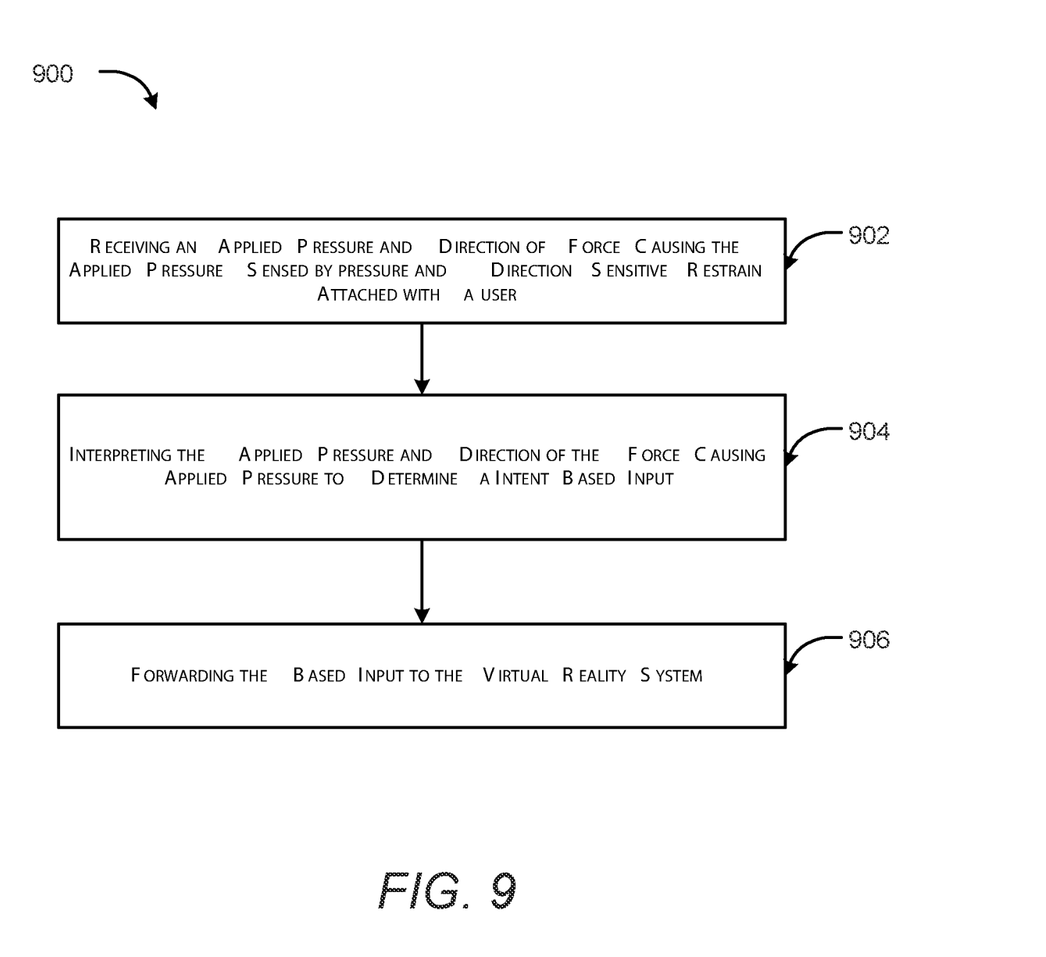
FIG. 9 illustrates via an exemplary flowchart, the working of a system and method to provide intent based inputs to a virtual reality system, in accordance with an embodiment of the present disclosure.

FIG. 9 illustrates via an exemplary flowchart, the working of a system and method to provide intent based inputs to a virtual reality system, in accordance with an embodiment of the present disclosure. As shown in FIG. 9, the method includes steps of receiving an applied pressure (magnitude of applied pressure) and direction of force causing the applied pressure sensed by pressure and direction sensitive restraint (PDSR) fastened to a user as shown at step 902, interpreting the applied pressure and direction of force causing the applied pressure to determine a intent based input, as shown at step 904 and forwarding the intent based input to the Virtual Reality System as shown at step 906, wherein the virtual reality system can then use the intent input to replicate the user's intended actions in the VR environment and can provide visual and/or aural feedback to the user.

In an exemplary embodiment of the present disclosure, the system can be used to replace mouse and touch controls in PC, laptop and similar devices. A small arrangement to fit in a finger surrounded by PDSRs can be used to track the intent of finger movement. Such a device can control all standard PC operations by moving the mouse cursor, without the user having to move his/her finger. This can be of great use for the people who find it difficult move their finger or to put their hands on laptop. In another exemplary embodiment, multiple finger input can be made possible for multi touch applications for tablets and similar devices, using similar arrangements on different fingers.

In another exemplary embodiment, the system of the present disclosure can be applied for head of a user, tracking the intent of head movement of a user and rotate or change the display according to such intent. Such an arrangement can potentially replace a head mounted display or a virtual reality headset.

As can be appreciated, the system and method disclosed is not restrictive and can get inputs from all body parts. It can be highly precise and accurate, can take into account the amount of force applied by a body part and can provide force feedback accordingly to that body part. The system can provide inputs for the virtual reality system to replicate the user's intended actions in the virtual reality environment and provide visual and/or aural feedback to the user; and does not depend only on explicit movements for its operation. Using the system and method of the present disclosure, users will not get tired as nothing is actually moving and hence no work being done, only force being applied.

In the system and method of the present disclosure the force can be rescaled in the avatar to make users do things that are not physically easy to do or are entirely impossible to do such as back flips, very high jumps in a game, change body direction mid air etc.

As can be appreciated, a user's virtual movements can become scaled up physical movements. After using the system of the present disclosure for a while, the user's mind can accommodate change of scale. User's brain can also model this change as an impact similar to increased length of arms, where the muscle efforts result in larger spatial movement than usual. The user's body can keep getting accommodated and convinced with the experience every passing minute and user can slowly start feeling the avatar's body as its own.

Since users can get actual force feedback using the system and method of the present disclosure, the exact force feedbacks as in a real world can be added. Using a few more haptic feedback systems, the system and method of the present disclosure can simulate experiences liking jerks, hitting a ball with a bat etc. and so the virtual reality system and experience can be made highly immersive.

The system and method of the present disclosure can be replicated very easily for all body parts and can track minute details like movement of fingers of a hand to large movements like bending torso with unparalleled accuracy.

In an embodiment, the arrangements shown in FIGS. 1 through 7 can be placed as separate arrangements or can be combined. In a separate embodiment, the combined arrangement can further be paired up with additional PDSRs such as for shoulders, torso, head, and other body parts to complete a full body tracking system.

There being no moving parts, the system and method of the present is very simple, uncomplicated and safe to use. The system and method of present disclosure enables the user to experience running and jumping activity without actually moving from there spot.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a system for providing intent based input to a virtual reality system.

The present disclosure provides for a method for providing intent based input to a virtual reality system.

The present disclosure provides for a system for providing intent based input to a virtual reality system that can enable a user to fully immerse in the virtual environment.

The present disclosure provides a system that provides inputs for the virtual reality system to replicate the user's intended actions in the virtual reality environment and provide visual and/or aural feedback to the user.

The present disclosure provides a system does not depend only on explicit movements for its operation.

The present disclosure provides a system that enable user to provide input(s) without actually moving and hence no work being done, only force being applied.

The present disclosure provides a system that allows rescaling in the avatar to allow users do things that are not physically easy to do or those that are entirely impossible to do such as back flips, very high jumps in a game, change body direction mid air and the likes.

I claim:

1. A system for providing an intent based input to a virtual reality system, the system comprising:
   at least one pressure and direction sensitive restraint, wherein said at least one pressure and direction sensitive restraint is configured to sense any or a combination of magnitude of pressure and direction of force exerted thereon when fastened to a user; and
   a pressure and direction information receiving module, wherein said pressure and direction information receiving module is configured to receive any or a combination of the magnitude of pressure and the direction of force from said at least one pressure and direction sensitive restraint and wherein said pressure and direction information receiving module is further configured to interpret the magnitude of pressure and the direction of force to determine an intent of the user to be inputted to the virtual reality system to replicate intended actions of the user, wherein the intended actions of the user are replicated by moving a graphical representation of body parts of the user, wherein the movement of the graphical representation of the body parts of the user is a mirror representation of the direction and magnitude of the force applied by corresponding body parts of the user in a real environment.

2. The system as claimed in claim 1, wherein said at least one pressure and direction sensitive restraint is fastened to any or a combination of hand, leg, shoulder, ankle, head and torso of the user to restrain movement thereof.

3. The system as claimed in claim 1, wherein said at least one pressure and direction sensitive restraint comprises at least one anchor and at least one substantially rigid body connected thereto via a holder.

4. The system as claimed in claim 3, wherein said at least one anchor is fastened to a fixed joint and wherein said at least one substantially rigid body is fastened to a moveable joint of the user.

5. The system as claimed in claim 1, wherein said pressure and direction information receiving module is coupled to said at least one pressure and direction sensitive restraint via any or a combination of a wired means and a wireless means.

6. The system as claimed in claim 1, wherein said intent of the user is inputted to the virtual reality system via any or a combination of a wired means and a wireless means.

7. A method to provide an intent based input to a virtual reality system, the method comprising the steps of:

receiving an applied pressure and a direction of force causing the applied pressure sensed by a pressure and direction sensitive restraint fastened to a user;
interpreting the applied pressure and the direction of force causing the applied pressure to determine an intent based input; and
forwarding the intent based input to the virtual reality system to replicate user's intended actions in said virtual reality system, wherein the intended actions of the user are replicated by moving a graphical representation of body parts of the user, wherein the movement of the graphical representation of the body parts of the user is a mirror representation of the direction and magnitude of the force applied by corresponding body parts of the user in a real environment.

8. The method as claimed in claim 7, wherein said pressure and direction sensitive restraint is fastened to any or a combination of hand, leg, shoulder, ankle, head and torso of the user to restrain movement thereof.

9. The method as claimed in claim 7, wherein said pressure and direction sensitive restraint comprises at least one anchor and at least one substantially rigid body connected thereto via a holder.

10. The method as claimed in claim 9, wherein said at least one anchor is fastened to a fixed joint and wherein said at least one substantially rigid body is fastened to a moveable joint of the user.

\* \* \* \* \*